United States Patent [19]

Brooks et al.

[11] 4,225,302
[45] Sep. 30, 1980

[54] TANK FORMING MANDREL WITH TANK BOTTOM MOLD

[75] Inventors: Julius C. Brooks; Kenneth D. Pfeifer, both of Huntingdon; Robert M. Sommerkamp, Mt. Union, all of Pa.

[73] Assignee: Owens-Corning Fiberglas Corporation, Toledo, Ohio

[21] Appl. No.: 21,407

[22] Filed: Mar. 19, 1979

[51] Int. Cl.² .................... B29C 13/04; B29C 23/00; B29C 1/16
[52] U.S. Cl. .................................... 425/438; 425/441; 425/471
[58] Field of Search ............... 425/418, 422, 469, 470, 425/436 RM, 471, 441, 436 R, 176, 182, 272, 274, 351, 457, 468, 443, 438; 264/309, 334, 310

[56] References Cited

U.S. PATENT DOCUMENTS

| | | | |
|---|---|---|---|
| 2,100,832 | 11/1937 | Bratring | 425/274 |
| 3,412,891 | 11/1968 | Bastone et al. | 156/173 |
| 3,454,983 | 7/1969 | Anderson et al. | 425/438 |
| 3,492,186 | 1/1970 | Young | 156/425 |
| 3,509,251 | 4/1970 | Anderson et al. | 264/259 |
| 3,655,468 | 4/1972 | Bastone et al. | 156/173 |
| 3,661,294 | 5/1972 | Pearson et al. | 428/35 |
| 3,700,512 | 10/1972 | Pearson et al. | 156/173 |
| 3,814,783 | 6/1974 | Dardaine et al. | 425/527 |
| 3,990,826 | 11/1976 | Marcus | 425/525 |
| 4,088,526 | 5/1978 | Amberg | 156/446 |

Primary Examiner—W. E. Hoag
Attorney, Agent, or Firm—Ronald C. Hudgens; Kenneth H. Wetmore; Paul J. Rose

[57] ABSTRACT

The mandrel includes a generally cylindrical but tapered outer molding surface for forming a sidewall portion of a tank from thermosetting resin and reinforcing material deposited thereon and a tank bottom mold for forming a bottom portion of the tank integrally with the sidewall portion. The tank bottom mold is shiftable to strip a completed tank from the tapered molding surface.

3 Claims, 4 Drawing Figures

TANK FORMING MANDREL WITH TANK BOTTOM MOLD

This invention relates generally to mandrels for forming tanks of glass fiber reinforced thermosetting resin, and more particularly to such a mandrel which includes a tank bottom or end cap mold in addition to the usual generally cylindrical molding surface for forming the tank sidewall.

An object of the invention is to provide a mandrel on which a bottom wall portion of a tank may be formed integrally and substantially simultaneously with the sidewall portion.

Another object is to provide such a mandrel wherein a tank bottom mold is shiftable axially of the mandrel to remove a tank formed thereon.

Other objects and advantages will become apparent when the following specification is considered along with the accompanying drawings in which.

Figure 1:
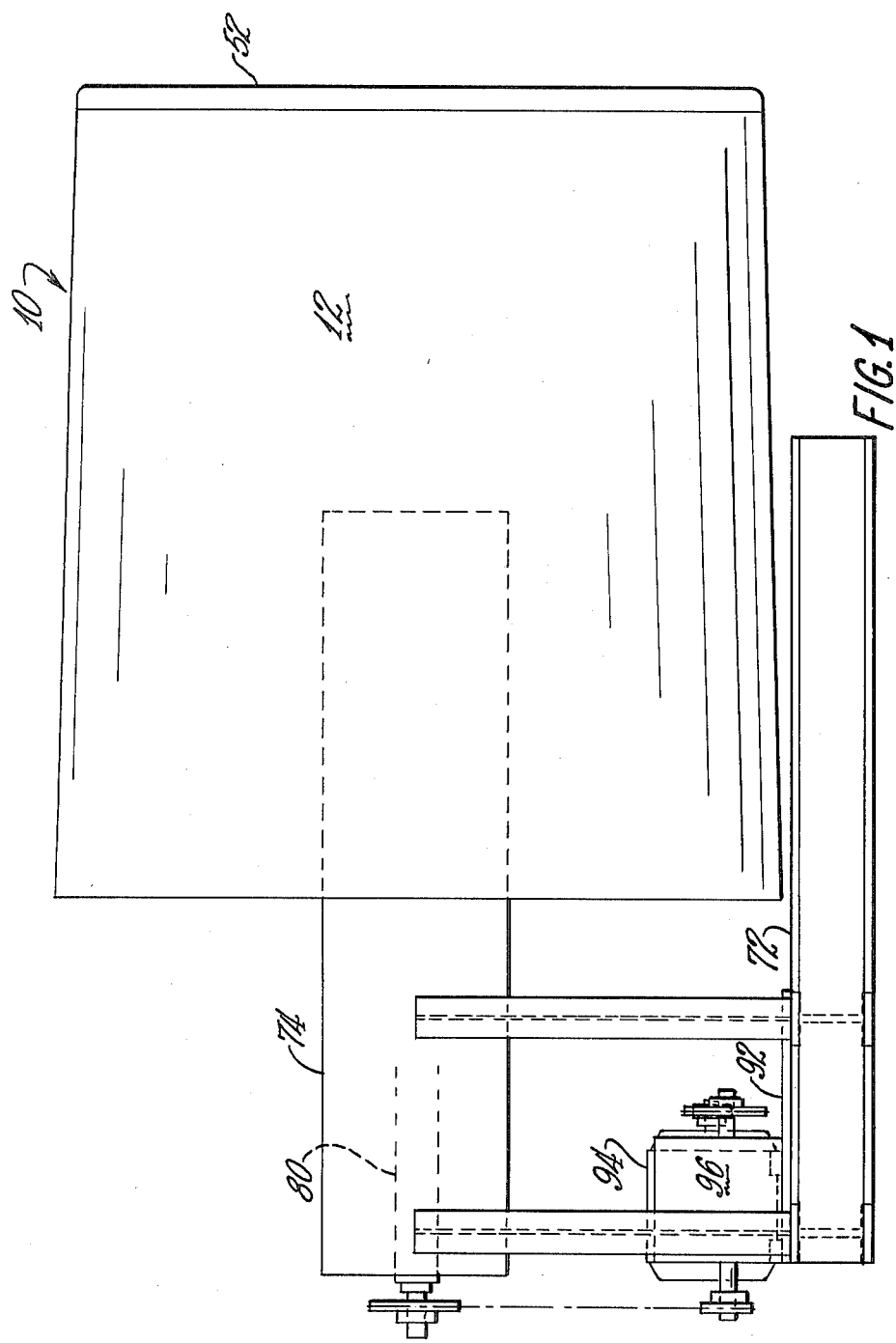
FIG. 1 is a side elevational view of a mandrel constructed in accordance with the invention and support and drive means therefor.
Figure 2:
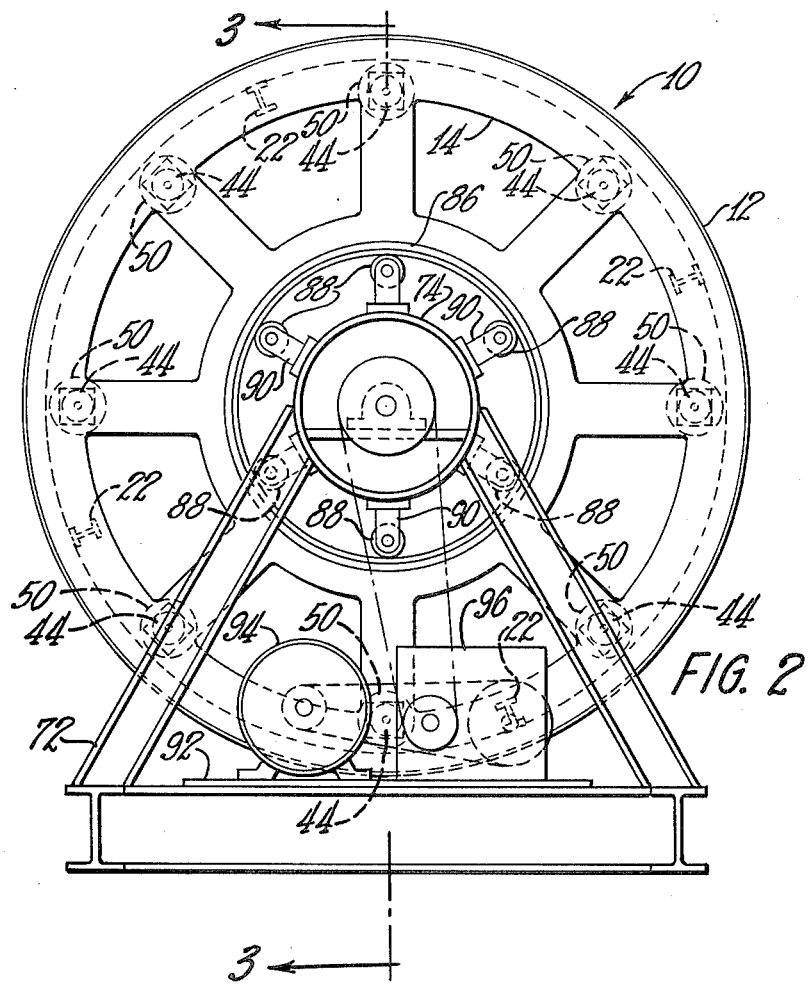
FIG. 2 is a rear elevational view of the apparatus of FIG. 1.
Figures 3, 4:
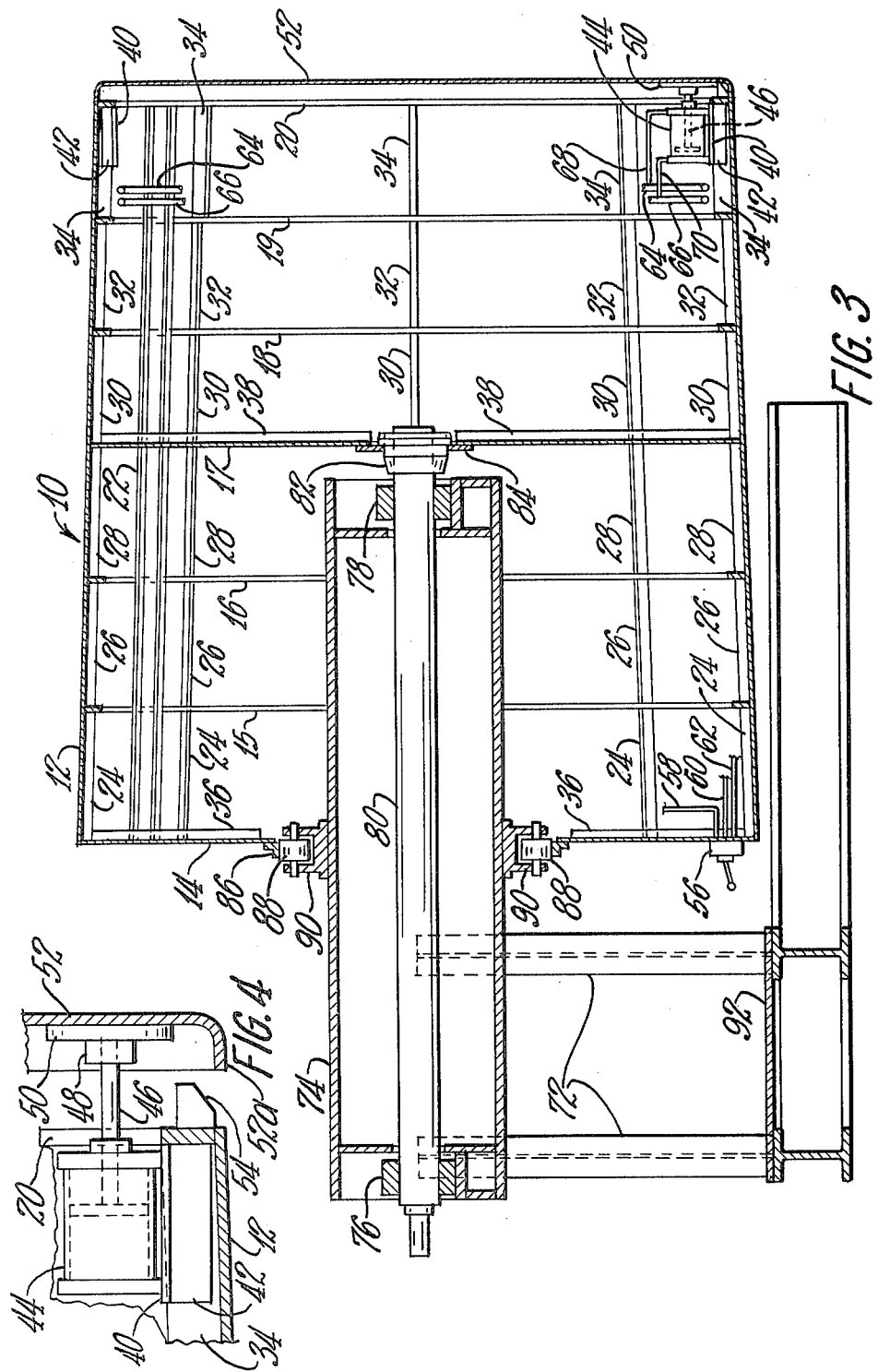
FIG. 3 is a vertical sectional view taken generally along the line 3—3 of FIG. 2, certain portions being omitted.
FIG. 4 is an enlarged fragmentary sectional view taken from a lower right-hand portion of FIG. 3, but showing the tank bottom mold in an extended position.

With respect to the drawings, FIGS. 1-3 show a mandrel 10 constructed in accordance with the invention. The mandrel 10 includes a generally cylindrical but tapered shell 12 providing an outer molding surface 35 upon which liquid thermosetting resin, chopped glass fiber strands, and glass filament windings are deposited in a known manner to form a sidewall portion of a tank. The shell 12 is supported on a circular rear support plate 14, rings 15 and 16, a circular front support plate 17, and rings 18, 19, and 20 spaced from each other, having successively decreasing outer diameters, and being joined by four I-beams 22 secured thereto. The I-beams 22 are equally arcuately spaced from each other, as shown in FIG. 2, and extended respectively through suitable apertures (not shown) in the front support plate 17.

The rear support plate 14 and the ring 15 are joined by eight equally arcuately spaced bars 24, only four of which are shown in FIG. 3. Similarly, the rings 15 and 16 are joined by eight bars 26, the ring 16 and the front support plate 17 are joined by eight bars 28, the front support plate 17 and the ring 18 are joined by eight bars 30, the rings 18 and 19 are joined by eight bars 32, and the rings 19 and 20 are joined by eight bars 34, only five of the bars 30, 32, and 34 being shown. The rear support plate 14 is reinforced by eight equally arcuately spaced radially extending bars 36 and the front support plate 17 is reinforced by eight equally arcuately spaced radially extending bars 38, only two of the bars 36 and 38 being shown.

Each of the bars 34 has a plate 40 mounted thereon by a pair of anchoring plates 42 disposed respectively on opposite sides of bar 34. Each plate 40 has a pneumatic actuator 44 mounted thereon, only one being shown in FIG. 3.

At best shown in FIG. 4, each actuator 44 includes a piston rod 46 extending outwardly from one end thereof and threaded into an anchoring collar 48 secured to a pushing plate 50. The eight pushing plates 50 are welded to the inside of a flanged tank bottom mold 52 on which liquid thermosetting resin and chopped glass strands are sprayed in a known manner to form a bottom portion of a tank simultaneously with formation of the sidewall portion on the shell 12 to produce a seamless tank. Prior mandrels, as disclosed in U.S. Pat. Nos. 3,412,891, 3,454,983, 3,492,186, 3,509,251, 3,655,468, 3,661,294, and 3,700,512 do not include an end cap or tank bottom mold as part of the mandrel, although U.S. Pat. No. 3,509,251 discloses a push-off ring 78 for pushing a tank off the mandrel. Eight chamfered guide plates 54 are secured in equally arcuately spaced relationship to each other on the ring 20 for guiding the tank bottom mold 52 by its flange portion 52a on the return stroke of the piston rods 46. The piston rods 46 are extended to break the sidewall portion of a tank loose from the shell 12 on which it is formed.

A four-way control valve 56 is mounted on the rear support plate 14. The valve 56 is fed by an inlet line 58 connected to a rotary air joint (not shown). Reverse line 60 and forward line 62 from the valve 56 are connected respectively to a circular reverse manifold 64 and a circular forward manifold 66. Each actuator 44 is connected to the reverse manifold 64 by a line 68 and to the forward manifold 66 by a line 70.

An I-beam framework 72 supports a stationary sleeve 74 having bearings 76 and 78 mounted therein respectively adjacent opposite ends thereof. A shaft 80 is rotatably mounted in the bearings 76 and 78 and operatively connected to the front support plate 17 by a hub 82 and a collar 84. The rear support plate 14 is joined to a bearing collar 86 rotatably mounted on a plurality of rollers 88 which in turn are rotatably mounted respectively in a plurality of clevis blocks 90 disposed around the sleeve 74.

The framework 72 also supports a platform 92 on which a motor 94 and gear reducer 96 are mounted for driving the shaft 80.

Various modifications may be made in the structure shown and described without departing from the spirit and scope of the invention as set forth in the following claims. The tank bottom mold 52 is flat for the production of vertically extending tanks. It could be concave or convex for the forming of end caps on tank halves joined together to form horizontally extending tanks.

We claim:

1. A rotatable mandrel comprising a generally cylindrical but tapered shell rotatable about a horizontal axis and providing an outer molding surface for the forming of a sidewall portion of a tank out of thermosetting resin and reinforcing material, a tank bottom or end cap mold adjacent a smaller end portion of the shell for the forming of a bottom or end cap portion of a tank integrally with the sidewall portion thereof, and a plurality of actuators mounted in the shell adjacent the tank bottom or end cap mold in equally arcuately spaced relationship to each other and each having a reciprocable member operatively connected to the tank bottom or end cap mold, the reciprocable members being extensible to free the sidewall portion of a tank from the shell and retractable to abut the smaller end portion of the shell with the tank bottom or end cap mold, the tank bottom or end cap mold having a peripheral flange portion which in effect is an extension of the shell when in abutting relationship therewith.

2. A rotatable mandrel as claimed in claim 1 including an interior support ring in the smaller end portion of the shell and a plurality of chamfered guide plates mounted on the ring in equally arcuately spaced relationship to each other for guiding the tank bottom or end cap mold, during retraction of the reciprocable members, by engagement with the peripheral flange portion.

3. A rotatable mandrel as claimed in claim 1 including a plurality of pushing plates mounted inside tha tank bottom or end cap mold in equally arcuately spaced relationship to each other and a plurality of anchoring collars mounted respectively on the pushing plates, and wherein the exterior end portions of the reciprocable members are secured respectively in the collars.

* * * * *